(12) United States Patent
Sinha et al.

(10) Patent No.: US 11,430,447 B2
(45) Date of Patent: Aug. 30, 2022

(54) VOICE ACTIVATION BASED ON USER RECOGNITION

(71) Applicant: QUALCOMM Incorporated, San Diego, CA (US)

(72) Inventors: Ashank Kumar Sinha, Hyderabad (IN); Pramod Kalvakota, Hyderabad (IN); Debasis Bhowmick, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 74 days.

(21) Appl. No.: 16/685,825

(22) Filed: Nov. 15, 2019

(65) Prior Publication Data

US 2021/0151057 A1    May 20, 2021

(51) Int. Cl.
| | | |
|---|---|---|
| G10L 17/00 | (2013.01) | |
| G10L 17/04 | (2013.01) | |
| G10L 17/06 | (2013.01) | |
| G06V 40/10 | (2022.01) | |

(52) U.S. Cl.
CPC ............. *G10L 17/00* (2013.01); *G06V 40/10* (2022.01); *G10L 17/04* (2013.01); *G10L 17/06* (2013.01)

(58) Field of Classification Search
CPC ......... G10L 17/00; G10L 17/04; G10L 17/06; G06K 9/00362
USPC ........................................................ 704/246
See application file for complete search history.

(56) References Cited

U.S. PATENT DOCUMENTS

| | | | | |
|---|---|---|---|---|
| 8,509,488 B1* | 8/2013 | Enge | .................. | G01C 21/3623 701/55 |
| 8,878,773 B1* | 11/2014 | Bozarth | .................... | G06T 7/74 382/103 |
| 8,913,004 B1* | 12/2014 | Bozarth | ................ | G06F 1/3234 348/78 |
| 9,098,467 B1* | 8/2015 | Blanksteen | ............. | G06F 3/167 |
| 9,972,318 B1* | 5/2018 | Kelly | ....................... | G10L 15/26 |
| 10,032,451 B1* | 7/2018 | Mamkina | ................ | G06F 21/32 |
| 10,076,705 B2* | 9/2018 | Deshpande | ............. | A63F 13/00 |
| 10,217,286 B1* | 2/2019 | Angel | ..................... | G06V 20/59 |
| 10,353,460 B2* | 7/2019 | Shazly | .................. | A61B 5/1114 |
| 10,513,269 B2* | 12/2019 | Stein | ..................... | B62D 15/021 |
| 10,715,604 B1* | 7/2020 | Bao | ........................ | H04L 67/306 |
| 10,847,149 B1* | 11/2020 | Mok | ....................... | G10L 15/22 |
| 10,957,329 B1* | 3/2021 | Liu | ..................... | G06F 16/9038 |
| 2011/0301956 A1* | 12/2011 | Sano | ......................... | G06F 3/16 704/E15.001 |

(Continued)

OTHER PUBLICATIONS

International Search Report and Written Opinion—PCT/US2020/060634—ISA/EPO—dated Feb. 10, 2021.

*Primary Examiner* — Edwin S Leland, III
(74) *Attorney, Agent, or Firm* — Moore IP

(57) ABSTRACT

A device for voice activation includes one or more processors. The one or more processors are configured to receive, via one or more microphones, a keyword and a first command spoken by a first user. The one or more processors are also configured to, subsequent to receiving the first command, receive a second command via the one or more microphones without an intervening receipt of the keyword. The one or more processors are further configured to, based at least in part on determining that the second command is spoken by the same first user, selectively process the second command.

30 Claims, 7 Drawing Sheets

(56) References Cited

U.S. PATENT DOCUMENTS

| | | | | |
|---|---|---|---|---|
| 2012/0314914 | A1* | 12/2012 | Karakotsios | G06V 40/193 382/118 |
| 2014/0249817 | A1* | 9/2014 | Hart | G10L 15/22 704/239 |
| 2015/0106089 | A1* | 4/2015 | Parker | G10L 25/48 704/235 |
| 2015/0169053 | A1* | 6/2015 | Bozarth | G06F 1/3234 345/156 |
| 2016/0313902 | A1* | 10/2016 | Hill | G06F 3/017 |
| 2017/0084275 | A1* | 3/2017 | Koetz | G06V 40/161 |
| 2017/0243578 | A1* | 8/2017 | Son | G10L 21/0232 |
| 2018/0165506 | A1* | 6/2018 | George | G06F 3/011 |
| 2018/0275753 | A1* | 9/2018 | Publicover | G06F 3/04812 |
| 2019/0026951 | A1* | 1/2019 | Lehtiniemi | H04N 5/247 |
| 2019/0272459 | A1* | 9/2019 | Kim | G10L 17/18 |
| 2019/0295320 | A1* | 9/2019 | Ghatak | G06F 3/011 |
| 2019/0371327 | A1* | 12/2019 | Quinn | G10L 15/063 |
| 2020/0035237 | A1* | 1/2020 | Kim | A61H 99/00 |
| 2020/0193976 | A1* | 6/2020 | Cartwright | G06F 3/011 |
| 2020/0312318 | A1* | 10/2020 | Olson | G10L 15/08 |
| 2021/0081749 | A1* | 3/2021 | Claire | G06N 3/004 |
| 2021/0117009 | A1* | 4/2021 | Vilsmeier | G06F 3/013 |
| 2021/0151057 | A1* | 5/2021 | Sinha | G10L 17/00 |
| 2021/0286980 | A1* | 9/2021 | Stawiszynski | G06V 20/56 |

* cited by examiner

US 11,430,447 B2

VOICE ACTIVATION BASED ON USER RECOGNITION

I. FIELD

The present disclosure is generally related to voice activation based on user recognition.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

A computing device can interact with a user to perform spoken commands, such as play a song, increase volume, switch on a light, etc. Typically, a user has to say a predetermined keyword before saying the command to enable the computing device to distinguish the command from other user speech. In many cases, a user gives multiple commands one after the other to the computing device. Saying the predetermined keyword prior to speaking each command takes longer and unfavorably impacts user experience. In addition, detecting the keyword each time uses computational resources.

III. SUMMARY

In a particular aspect, a device for voice activation includes one or more processors. The one or more processors are configured to receive, via one or more microphones, a keyword and a first command spoken by a first user. The one or more processors are also configured to, subsequent to receiving the first command, receive a second command via the one or more microphones without an intervening receipt of the keyword. The one or more processors are further configured to, based at least in part on determining that the second command is spoken by the same first user, selectively process the second command.

In another particular aspect, a method for voice activation includes receiving, via one or more microphones, a keyword and a first command spoken by a first user. The method also includes, subsequent to receiving the first command, receiving a second command via the one or more microphones without an intervening receipt of the keyword. The method further includes, based at least in part on determining that the second command is spoken by the same first user, selectively processing the second command.

In another particular aspect, a computer-readable storage device stores instructions that, when executed by one or more processors, causes the one or more processors to receive, via one or more microphones, a keyword and a first command spoken by a first user. The instructions, when executed by the one or more processors, also cause the one or more processors to, subsequent to receiving the first command, receive a second command via the one or more microphones without an intervening receipt of the keyword. The instructions, when executed by the one or more processors, also cause the one or more processors to, based at least in part on determining that the second command is spoken by the same first user, selectively process the second command.

In another particular aspect, an apparatus includes means for receiving an audio signal corresponding to speech. The apparatus also includes means for determining that the audio signal includes a keyword and a first command spoken by a first user, and includes a second command that follows the first command without the keyword in between the first command and the second command. The apparatus further includes means for selectively processing the second command based at least in part on determining that the second command is spoken by the same first user.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Systems and methods of voice activation based on user recognition are disclosed. A computing device receives a keyword (e.g., "hello assistant") and a first command (e.g., "play my music") spoken by a user. The computing device receives a second command (e.g., "volume seven") subsequent to receiving the first command (e.g., "play my music"). For example, the computing device receives the second command prior to, during, or subsequent to processing the first command. The computing device selectively processes the second command. For example, the computing device processes the second command (e.g., sets volume to 7) if the second command (e.g., "volume seven") is spoken by the same user that spoke the keyword (e.g., "hello assistant") and the second command is received within a threshold duration of receiving the first command (e.g., "play my music"). The computing device can also perform one or more additional commands that are spoken by the same user within the threshold duration of each other. The multiple commands are processed without the user having to say the keyword (e.g., "hello assistant") multiple times. In a particular example, another user can begin interacting with the computing device at any time by saying the keyword (e.g., "hello assistant"). The computing device selectively processes commands spoken by the same user who most recently said the keyword.

Figure 1:
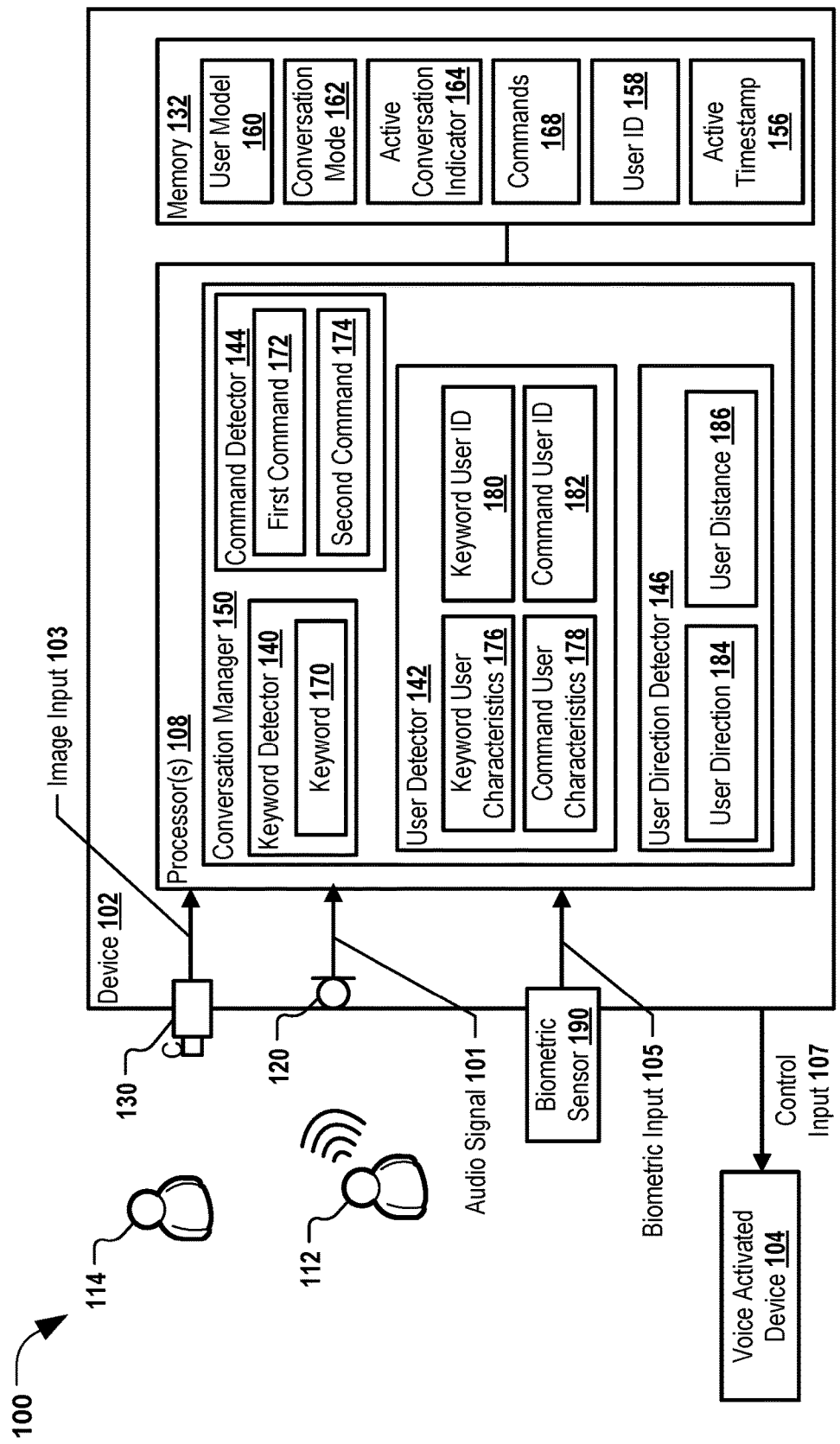
FIG. 1 is a block diagram of a particular illustrative aspect of a system operable to perform voice activation based on user recognition.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 108 in FIG. 1), which indicates that in some implementations the device 102 includes a single processor 108 and in other implementations the device 102 includes multiple processors 108. For ease of reference herein, such features are generally introduced as "one or more" features, and are subsequently referred to in the singular unless aspects related to multiple of the features are being described.

It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system operable to perform voice activation based on user recognition is disclosed and generally designated 100. The system 100 includes a device 102 that is coupled to a voice activated device 104. The device 102 is illustrated as separate from the voice activated device 104 as an illustrative example. In some examples, the device 102 and the voice activated device 104 are integrated into a single device. The device 102, the voice activated device 104, or both, include one or more a computing device, a voice assistant, an internet-of-things (IoT) controller, an IoT device, a car, a vehicle, a climate control system, a light system, an electrical system, a sprinkler system, a security system, an appliance, a playback device, a television, a media device, a virtual reality (VR) headset, an augmented reality (AR) headset, a mixed reality (MR) headset, an extended reality (XR) headset, a head-mounted display (HMD), an audio device, a wireless speaker and voice activated device, or a combination thereof. In a particular aspect, the device 102, the voice activated device 104, or both, include an integrated assistant application. In a particular aspect, the processor 108 is included in an integrated circuit.

It should be noted that in the following description, various functions performed by the system 100 of FIG. 1 are described as being performed by certain components or modules. However, this division of components and modules is for illustration only. In an alternate aspect, a function described herein as performed by a particular component or module may be divided amongst multiple components or modules. Moreover, in an alternate aspect, two or more components or modules of FIG. 1 may be integrated into a single component or module. Each component or module illustrated in FIG. 1 may be implemented using hardware (e.g., a field-programmable gate array (FPGA) device, an application-specific integrated circuit (ASIC), a digital signal processor (DSP), a controller, etc.), software (e.g., instructions executable by a processor), or any combination thereof.

The device 102 includes one or more processors 108 coupled to a memory 132.

The processor 108 includes a conversation manager 150. The conversation manager 150 includes a keyword detector 140, a user detector 142, a command detector 144, a user direction detector 146, or a combination thereof. The processor 108 is coupled to one or more image sensors 130, one or more microphones 120, one or more biometric sensors 190, or a combination thereof.

The microphone 120 is configured to provide an audio signal 101 to the processor 108. The audio signal 101 represents sounds captured by the microphone 120. The keyword detector 140 is configured to perform speech recognition on the audio signal 101 to determine whether a keyword 170 is detected. The command detector 144 is configured to perform speech recognition on the audio signal 101 to determine whether any of a plurality of commands 168 is detected. In a particular aspect, the keyword 170, the commands 168, or a combination thereof, are based on default data, a configuration setting, a user input, or a combination thereof.

The user detector 142 is configured to determine user characteristics associated with a portion of the audio signal 101. For example, the user detector 142 is configured to generate keyword user characteristics 176 based on a portion of the audio signal 101 that corresponds to the keyword 170 (e.g., "hello assistant") and to generate one or more command user characteristics 178 based on a portion of the audio signal 101 that corresponds to a command of the commands 168. In a particular aspect, the user detector 142 is configured to determine or generate a keyword user ID 180 associated with the keyword user characteristics 176. In a particular aspect, the user detector 142 is configured to determine or generate a command user ID 182 associated with the command user characteristics 178. In a particular aspect, the user characteristics include biometric characteristics associated with the portion of the audio signal 101. For example, the biometric characteristics include speech characteristics indicated by the portion of the audio signal 101. In another particular aspect, the user characteristics include a source location (e.g., a driver seat of a car) of the portion of the audio signal 101.

The user direction detector 146 is configured to determine whether speech detected in a portion of the audio signal 101 is directed to the microphone 120. In some examples, the user direction detector 146 is configured to, in response to determining that a user is looking toward the microphone 120 while speaking, determine that speech of the user is directed to the microphone 120.

The memory 132 is configured to store a user model 160, a conversation mode 162, an active conversation indicator 164, one or more commands 168, a user identifier (ID) 158, additional data, or a combination thereof. In a particular aspect, the user model 160 is based on user characteristics associated with a user 112 having the user ID 158. In a particular aspect, the user model 160 includes a speech model based on speech characteristics of the user 112, a facial model based on facial image characteristics of the user 112, etc. The commands 168 include voice activation commands that are recognized by the command detector 144. In a particular aspect, the commands 168 are based on default data, configuration data, user data, or a combination thereof.

In a particular aspect, the conversation manager 150 is configured to start a conversation session with a user 112 responsive to receiving the keyword 170 (e.g., "hello assistant") from the user 112. The conversation manager 150 is configured to process a command in response to determining that the command is received from the user 112 during a conversation session with the user 112. The conversation manager 150 is configured to refrain from processing any commands from the user 112 that are received outside a conversation session with the user 112. In some examples, the conversation manager 150 is configured to end a conversation session with the user 112 in response to receiving the keyword 170 (e.g., "hello assistant") from another user, detecting that at least a particular duration has expired since the last received command from the user 112, detecting that no commands have been received from the user 112 within a particular duration of receiving the keyword 170 from the user 112, receiving user input indicating an end conversation session request, receiving an end conversation session command from the user 112, or a combination thereof. In a particular aspect, a first value (e.g., 0) of the active conversation indicator 164 indicates that there is no active on-going conversation session. A second value (e.g., 1) of the active conversation indicator 164 indicates that there is an on-going conversation session with a user (e.g., the user 112) associated with the keyword user characteristics 176, the keyword user ID 180, or both.

In a particular aspect, the conversation manager 150 is configured to start conversation sessions or refrain from starting conversation sessions based on whether a conversation mode is enabled. For example, the conversation mode 162 has a first value (e.g., 0) indicating that the conversation mode is disabled or a second value (e.g., 1) indicating that the conversation mode is enabled. To illustrate, the conversation manager 150 is configured to, when the conversation mode is disabled, process each command that is preceded by the keyword 170 and not process multiple commands following a single utterance of the keyword 170. In a particular aspect, the conversation mode 162 is based on configuration data, user input, a command, or a combination thereof.

In a particular implementation, the conversation manager 150 is configured to start conversation sessions with one or more authorized users and to refrain from starting conversation sessions with unauthorized users. For example, the memory 132 stores one or more user models associated with one or more authorized users. For example, the user model 160 is trained based on user characteristics of an authorized user associated with the user ID 158. In this implementation, the memory 132 stores one or more conversation modes associated with the one or more authorized users. For example, the conversation mode 162 has a value indicating whether the conversation mode is enabled for the authorized user associated with the user ID 158.

In another particular implementation, the conversation manager 150 is configured to start conversation sessions with any user, independently of whether the user is an authorized user. In this implementation, the conversation manager 150 determines keyword user characteristics 176 associated with the most recently received keyword 170. In a particular aspect, the conversation manager 150 is configured to select a user model 160 that matches the keyword user characteristics 176. Alternatively, the conversation manager 150 is configured to, in response to determining that the keyword user characteristics 176 do not match any user model, generate a user model 160 based on the keyword user characteristics 176. In this implementation, the conversation mode 162 indicates whether the conversation mode is enabled for any user.

During operation, a user 112 says a keyword 170 (e.g., "hello assistant") followed by a first command 172 (e.g., "play my music"). The keyword 170 may be a single keyword (e.g., "Activate") or a phrase (e.g., "hello assistant"), in various implementations. In a particular aspect, the keyword 170 corresponds to any keyword from a set of valid alternative keywords. For example, the set of keywords includes a first keyword (e.g., "Activate") and a second keyword (e.g., "hello assistant"), and speaking the first keyword or the second keyword corresponds to speaking the keyword 170. The microphone 120 captures speech of the user 112 and provides an audio signal 101 to the processor 108. Illustrative examples of the audio signal 101 are further described with reference to FIG. 2. The keyword detector 140 performs speech recognition on the audio signal 101 and determines that the keyword 170 is detected in a first portion of the audio signal 101. The keyword detector 140 provides the first portion of the audio signal 101 corresponding to the keyword 170 to the user detector 142.

In a particular implementation, the conversation manager 150 is configured to start conversation sessions with any user (e.g., authorized users and also non-authorized users). In this implementation, the conversation mode 162 indicates whether the conversation mode is enabled for all users. For example, when the conversation mode is enabled, multiple commands spoken by any user subsequent to the same user speaking the keyword 170 can be processed independently of identifying the user or determining whether the user is an authorized user. When the conversation mode is disabled, a single command spoken subsequent to speaking a keyword is processed and multiple commands spoken subsequent to speaking the keyword are not processed. The conversation manager 150, in response to determining that the conversation mode 162 has a first value (e.g., 0) indicating that conversation mode is disabled for all users, ends a previous conversation session, refrains from starting a conversation session, or both. For example, the keyword detector 140 sets the active conversation indicator 164 to have a first value (e.g., 0) to indicate that no active conversation is on-going. In a particular aspect, setting the active conversation indicator 164 to have the first value (e.g., 0) ends a previous conversation session. For example, the previous conversation session may have been started responsive to previously receiving the keyword 170 (e.g., "hello assistant") from another user. In a particular aspect, the keyword detector 140 refrains from providing the first portion of the audio signal 101 to the user detector 142. In a particular implementation, the conversation manager 150, in response to determining that conversation sessions are disabled, processes a single command received within a threshold duration of receiving the keyword 170 and refrains from processing multiple commands received subsequent to a single receipt of the keyword 170.

In a particular aspect, the conversation manager 150 starts a conversation session in response to determining that the conversation mode 162 has a second value (e.g., 1) indicating that conversation mode is enabled for any user, as described herein. The keyword detector 140 provides the first portion of the audio signal 101 to the user detector 142 in response to determining that the conversation mode 162 has the second value (e.g., 1) indicating that conversation mode is enabled for any user.

The user detector 142 determines one or more keyword user characteristics 176 associated with the first portion of the audio signal 101. In a particular aspect, the keyword user characteristics 176 include biometric characteristics. For example, the biometric sensor 190 sends biometric input 105 to the processor 108 concurrently with the microphone 120 sending the audio signal 101 to the processor 108.

In a particular aspect, the biometric sensor 190 includes the microphone 120, and the biometric input 105 includes the audio signal 101. In this aspect, the keyword user characteristics 176 include voice characteristics. For example, the user detector 142 determines voice (e.g., speech) characteristics indicated by the first portion of the audio signal 101.

In a particular aspect, the biometric sensor 190 includes the image sensor 130, and the biometric input 105 includes an image input 103 (e.g., an image of the user 112). In this aspect, the keyword user characteristics 176 include image characteristics. For example, the user detector 142 performs image processing to determine image characteristics indicated by the image input 103. In a particular aspect, the image characteristics include facial characteristics, retina characteristics, thumbprint characteristics, or a combination thereof.

In a particular aspect, the user detector 142 determines that the biometric input 105 is associated with the first portion of the audio signal 101 in response to determining that a first timestamp associated with the biometric input 105 matches (e.g., is within a threshold duration of) a second timestamp associated with the first portion of the audio signal 101. In some implementations, the user detector 142 performs biometric input processing to determine the keyword user characteristics 176 indicated by the biometric input 105. In a particular aspect, the keyword user characteristics 176 include facial characteristics, retina characteristics, thumbprint characteristics, voice characteristics, or a combination thereof.

In a particular aspect, the keyword user characteristics 176 include location characteristics. For example, the user detector 142 performs direction of arrival analysis on the first portion of the audio signal 101 to determine that the keyword 170 is spoken from a driver seat of a vehicle. In this example, the keyword user characteristics 176 indicate the driver seat of the vehicle. As another example, the user detector 142, in response to determining that the microphone 120 is coupled to a virtual reality (VR) headset, determines that the first portion of the audio signal 101 is spoken by a wearer of the VR headset. In this example, the keyword user characteristics 176 indicate the VR headset. The driver seat and the VR headset are provided as illustrative examples; in other examples, the keyword user characteristics 176 can include other types of location characteristics, such as global positioning system (GPS) coordinates, geographic coordinates, etc.

In a particular implementation, the user detector 142 determines whether the keyword user characteristics 176 match an existing user model stored in the memory 132 that was previously generated. The user detector 142 selects a user model 160 associated with a user ID 158 in response to determining that the keyword user characteristics 176 match the user model 160. For example, the user detector 142 may have previously generated the user model 160 based on user characteristics of the user 112. Alternatively, the user detector 142, in response to determining that the keyword user characteristics 176 do not match an existing user model, generates a user model 160 based on the keyword user characteristics 176, generates a user ID 158, and associates the user model 160 with the user ID 158. The user model 160 is based on the keyword user characteristics 176 of the user 112 and the user ID 158 (e.g., the generated user ID) is associated with the user 112.

The user detector 142 initiates a conversation session with the user 112. For example, the user detector 142 sets the keyword user ID 180 to indicate the user ID 158 associated with the user model 160 (e.g., the selected user model or the generated user model), sets the active conversation indicator 164 to have a second value (e.g., 1) indicating that an active conversation is on-going with the user 112 associated with the keyword user ID 180, sets an active timestamp 156 to indicate a timestamp associated with receiving the first portion of the audio signal 101, or a combination thereof. In a particular aspect, setting the active conversation indicator 164 to have the second value (e.g., 1) initiates a conversation session with the user 112 associated with the keyword user ID 180. In a particular aspect, setting the keyword user ID 180 ends a previous conversation session with another user. The keyword user ID 180 thus indicates a user who most recently spoke the keyword 170 (e.g., "hello assistant"). In a particular aspect, setting the active timestamp 156 starts a timer for the conversation session. For example, the conversation manager 150 ends the conversation session with the user 112 in response to determining that a command is not received from the user 112 within a threshold duration of a first time indicated by the active timestamp 156 (e.g., associated with receiving the keyword 170 from the user 112).

In a particular aspect, the command detector 144 performs speech recognition on the audio signal 101 and determines that the first command 172 (e.g., "play my music") of the commands 168 is detected in a second portion of the audio signal 101. In a particular aspect, the command detector 144 refrains from processing the first command 172 (e.g., "play my music") in response to determining that the conversation mode 162 has a first value (e.g., 0) indicating that conversation mode is disabled for all users. In a particular aspect, the command detector 144 refrains from processing the first command 172 (e.g., "play my music") in response to determining that the active conversation indicator 164 has a first value (e.g., 0) indicating that no active conversation is on-going. In a particular example, the active conversation indicator 164 has the first value (e.g., 0) when the first command 172 is not preceded by the keyword 170 (e.g., "hello assistant") spoken by any user within a threshold duration (e.g., previous 60 seconds) of the first command 172 being spoken by the user 112. For example, the conversation manager 150, in response to determining that a second time associated with receiving the first command 172 (e.g., "play my music") is greater than a threshold duration of a first time indicated by the active timestamp 156 (e.g., associated with receiving the keyword 170), sets the active conversation indicator 164 to the first value (e.g., 0) to indicate that no active conversation is on-going. In a particular aspect, setting the active conversation indicator 164 to the first value (e.g., 0) ends the conversation session with the user 112 who spoke the keyword 170 (e.g., "hello assistant"). The command detector 144, in response to determining that no active conversation is on-going (e.g., the conversation session has expired prior to receipt of the first command 172), refrains from processing the first command 172. Alternatively, the command detector 144, in response to determining that the active conversation indicator 164 has the second value (e.g., 1) indicating that an active conversation is on-going, provides the second portion of the audio signal 101 to the user detector 142.

The user detector 142 determines command user characteristics 178 associated with the second portion of the audio signal 101. The user detector 142 performs user recognition to determine whether the first command 172 is spoken by the same user that spoke the keyword 170. In a particular aspect, the user recognition includes voice recognition, facial recognition, or other biometric recognition. In a particular implementation, the user recognition includes determining whether the same user spoke the first command 172 (e.g., "play my music") and the keyword 170 (e.g., "hello assistant") independently of identifying the user. For example, the keyword user characteristics 176 are compared with the command user characteristics 178 to determine whether the likelihood that the first command 172 is spoken by the same user that spoke the keyword 170 exceeds a likelihood threshold (e.g., 80 percent).

In a particular implementation, the user detector 142 determines the keyword user ID 180 by performing a first user recognition on the keyword user characteristics 176 and determines the command user ID 182 by performing a second user recognition on the command user characteristics 178. In this implementation, the first user recognition can be different from the second user recognition. For example, the first user recognition can include voice recognition, facial recognition, another type of biometric recognition, location recognition, or a combination thereof, and the second user recognition can include voice recognition, facial recognition, another type of biometric recognition, location recognition, or a combination thereof. The keyword user characteristics 176 can include different types of user characteristics than included in the command user characteristics 178. The user detector 142, in response to determining that the command user ID 182 matches (e.g., is equal to or is associated with the same user as) the keyword user ID 180, determines that the first command 172 (e.g., "play my music") is spoken by the same user (e.g., the user 112) who spoke the keyword 170 (e.g., "hello assistant").

The command detector 144, in response to the determination that an active conversation session is on-going and that the first command 172 is spoken by the same user that spoke the keyword 170, processes the first command 172 (e.g., "play my music"), sets the active timestamp 156 to indicate the second time, or both. In a particular aspect, processing the first command 172 (e.g., "play my music") corresponds to generating a control input 107 based on the first command 172 and sending the control input 107 to the voice activated device 104. Sending the control input 107 to the voice activated device 104 initiates performance of one or more operations (e.g., playback of music) at the voice activated device 104. In a particular aspect, setting the active timestamp 156 resets the timer for the conversation session with that user. For example, the conversation manager 150 ends the conversation session with the user 112 in response to determining that another command is not received from the user 112 within a threshold duration of a second time indicated by the active timestamp 156 (e.g., associated with receiving the first command 172 from the user 112).

In a particular aspect, the command detector 144 performs speech recognition on the audio signal 101 and determines that a second command 174 (e.g., "set the volume to 7") of the commands 168 is detected in a third portion of the audio signal 101. The command detector 144, in response to determining that the active conversation indicator 164 has a second value (e.g., 1) indicating that an active conversation is on-going, determines whether the conversation session has expired prior to receipt of the second command 174 (e.g., "set the volume to seven"). For example, the command detector 144, in response to determining that a third time associated with receiving the second command 174 (e.g., "set the volume to seven") is greater than a threshold duration from a second time indicated by the active timestamp 156 (e.g., associated with receiving the first command 172), determines that the conversation session has expired and sets the active conversation indicator 164 to have a first value (e.g., 0) to indicate that no active conversation session is on-going. In a particular aspect, setting the active conversation indicator 164 to the first value (e.g., 0) ends the conversation session with the user 112. For example, if the second command 174 (e.g., "set the volume to seven") received after expiration of the conversation session is spoken by the user 112, the user 112 is likely not speaking voice commands to the device 102. To illustrate, the user 112 could be talking to a user 114 and not to the device 102. Ending the conversation session with the user 112 when the user 112 is likely no longer speaking voice commands to the device 102 conserves resources (e.g., processing resources and time used to detect commands) and may reduce the occurrence of unintended activation of the voice activated device 104. In a particular aspect, the user 112 can speak the keyword 170 (e.g., "hello assistant") again to start a new conversation session.

The command detector 144, in response to determining that the active conversation indicator 164 has a first value (e.g., 0) indicating that no active conversation session is on-going, refrains from processing the second command 174 (e.g., "set the volume to seven") because the second command 174 is not preceded by the keyword 170 and no active conversation session is on-going (e.g., the conversation session has expired). Alternatively, the command detector 144, in response to determining that the active conversation indicator 164 has a second value (e.g., 1) indicating that an active conversation is on-going, provides the third portion of the audio signal 101 to the user detector 142. The user detector 142, in response to determining that an active conversation session is on-going, determines whether the second command 174 is spoken by the same user (e.g., the user 112) that spoke the keyword 170. For example, the user detector 142 determines one or more command user characteristics 178 associated with the third portion of the audio signal 101. The user detector 142 determines, based on the keyword user characteristics 176 and the command user characteristics 178, whether the second command 174 is spoken by the same user that spoke the keyword 170.

In a particular aspect, the command detector 144, in response to the determination that the second command 174 is not spoken by the same user (e.g., the user 112) that spoke the keyword 170, refrains from processing the second command 174 (e.g., "set the volume to seven"). For example, the user detector 142 refrains from processing the second command 174 spoken by a user 114 when the keyword 170 is most recently spoken by the user 112. Alternatively, the command detector 144, in response to determining that an active conversation is on-going and that the second command 174 (e.g., "set the volume to seven") is spoken by the same user (e.g., the user 112) who spoke the keyword 170, processes the second command 174, sets the active timestamp 156 to the third time (associated with receiving the second command 174), or both. In a particular aspect, setting the active timestamp 156 resets the timer for the conversation session for that user. For example, the conversation manager 150 ends the conversation session with the user 112 in response to determining that another command is not received from the user 112 within a threshold duration from a third time indicated by the active timestamp 156 (e.g., associated with receiving the second command 174 from the user 112).

In a particular aspect, processing the second command 174 includes generating a control input 107 based on the second command 174 and sending the control input 107 to the voice activated device 104. Sending the control input 107 to the voice activated device 104 initiates performance of one or more operations (e.g., setting the volume to 7) at the voice activated device 104.

In a particular aspect, the command detector 144 selectively processes a command (e.g., the first command 172, the second command 174, or both) based at least in part on determining that the user 112 directed the command towards the microphone 120, towards the device 102, or both. For example, the command detector 144 determines whether the user 112 directed a command towards the microphone 120, towards the device 102, or both, based on a user direction 184, a user distance 186, or both, of the user 112 while speaking the command. To illustrate, the user direction detector 146 determines a user direction 184, a user distance 186, or both, associated with the third portion of the audio signal 101 associated with the second command 174. In a particular aspect, the user direction detector 146 performs direction of arrival analysis of the third portion of the audio signal 101 to determine the user direction 184, the user distance 186, or both, relative to the microphone 120. In a particular aspect, the user direction detector 146 determines the user direction 184, the user distance 186, or both, based on an image input 103 that is received from the image sensor 130 concurrently with receiving the third portion of the audio signal 101. For example, the user direction detector 146 determines a first user direction of the user 112 (e.g., a face of the user 112) relative to the image sensor 130 and estimates the user direction 184 of the user 112 relative to the microphone 120, the device 102, or both, based on the first user direction. As another example, the user direction detector 146 determines a first user distance of the user 112 relative to the image sensor 130 and estimates the user distance 186 of the user 112 relative to the microphone 120, the device 102, or both, based on the first user distance.

In a particular aspect, the command detector 144 determines that the user 112 directed the second command 174 (e.g., "set the volume to seven") towards the microphone 120 (or the device 102), in response to determining that the user direction 184 indicates that the user 112 spoke the second command 174 (e.g., "set the volume to seven") while looking towards the microphone 120 (or the device 102), that the user distance 186 indicates that the user 112 spoke the second command 174 while within a threshold distance from the microphone 120 (or the device 102), or both.

In a particular aspect, the command detector 144 processes the second command 174 (e.g., "set the volume to seven") based at least in part on determining that the user 112 directed the second command 174 (e.g., "set the volume to seven") to the microphone 120, the device 102, or both. Alternatively, the command detector 144 refrains from processing the second command 174 (e.g., "set the volume to seven") in response to determining that the user 112 did not direct the second command 174 (e.g., "set the volume to seven") to the microphone 120 or the device 102. For example, the user 112 may have spoken the second command 174 (e.g., "set the volume to seven") to a user 114.

In a particular aspect, the second command 174 (e.g., "disable conversation mode") includes an end session command. The command detector 144 processes the second command 174 (e.g., the end session command) by setting the active conversation indicator 164 to a first value (e.g., 0) to indicate that there are no on-going active conversations, setting the conversation mode 162 to a first value (e.g., 0) indicating that the conversation mode is disabled for all users, setting the conversation mode 162 to a first value (e.g., 0) indicating that the conversation mode is disabled for the user 112, or a combination thereof. In a particular aspect, setting the active conversation indicator 164 to the first value (e.g., 0) ends a conversation session with the user 112. In a particular aspect, the end session command can used to end a conversation session and a disable conversation mode command can be used to set the conversation mode 162 to a first value (e.g., 0) to disable the conversation mode for all users.

In a particular implementation, the conversation manager 150 is configured to start conversation sessions with one or more authorized users and to refrain from starting conversation sessions with unauthorized users, as described further below. In this implementation, the memory 132 stores one or more conversation modes 162 associated with one or more authorized users. For example, a conversation mode 162 is associated with a user ID 158 of an authorized user (e.g., the user 112). The conversation mode 162 indicates whether the conversation mode is enabled for the authorized user.

The keyword detector 140, in response to determining that the keyword 170 is not spoken by an authorized user or that the keyword 170 is spoken by an authorized user with a disabled conversation mode, ends a previous conversation session, refrains from starting a conversation session, or both. For example, the user detector 142 ends an on-going conversation with an authorized user in response to receiving the keyword 170 (e.g., "hello assistant") from an unauthorized user.

In a particular aspect, the keyword detector 140 determines that the keyword 170 is spoken by an authorized user in response to determining that the keyword user characteristics 176 match a user model 160 associated with a user ID 158 of an authorized user (e.g., the user 112). Alternatively, the keyword detector 140, in response to determining that the keyword 170 is spoken by an authorized user and that a conversation mode 162 associated with the authorized user has a second value (e.g., 1) indicating that the conversation mode is enabled for the authorized user, initiates a conversation session with the authorized user (e.g., the user 112). For example, the keyword detector 140 sets the keyword user ID 180 to indicate the user ID 158 associated with the user model 160. The keyword user ID 180 indicates a user ID associated with the most recent authorized user to have spoken the keyword 170. In a particular example, an authorized user speaks the keyword 170 followed by an unauthorized user speaking the keyword 170. In this example, the keyword user ID 180 continues to indicate a user ID of the authorized user (e.g., the most recent authorized user) and not of the unauthorized user (e.g., most recent user).

The system 100 thus enables the user 112 to initiate processing of multiple commands by saying the keyword 170 (e.g., "hello assistant") followed by the multiple commands without having to say the keyword 170 before each command. The system 100 selectively processes a command based on determining that the command is received from the user 112 within a threshold duration of receiving another command from the same user 112 who spoke the keyword 170.

Although various components of the device 102 are illustrated and described, in other implementations one or more components can be omitted. In some examples, one or more of the user direction detector 146, the conversation mode 162, or the image sensor 130 can be omitted.

Figure 2:
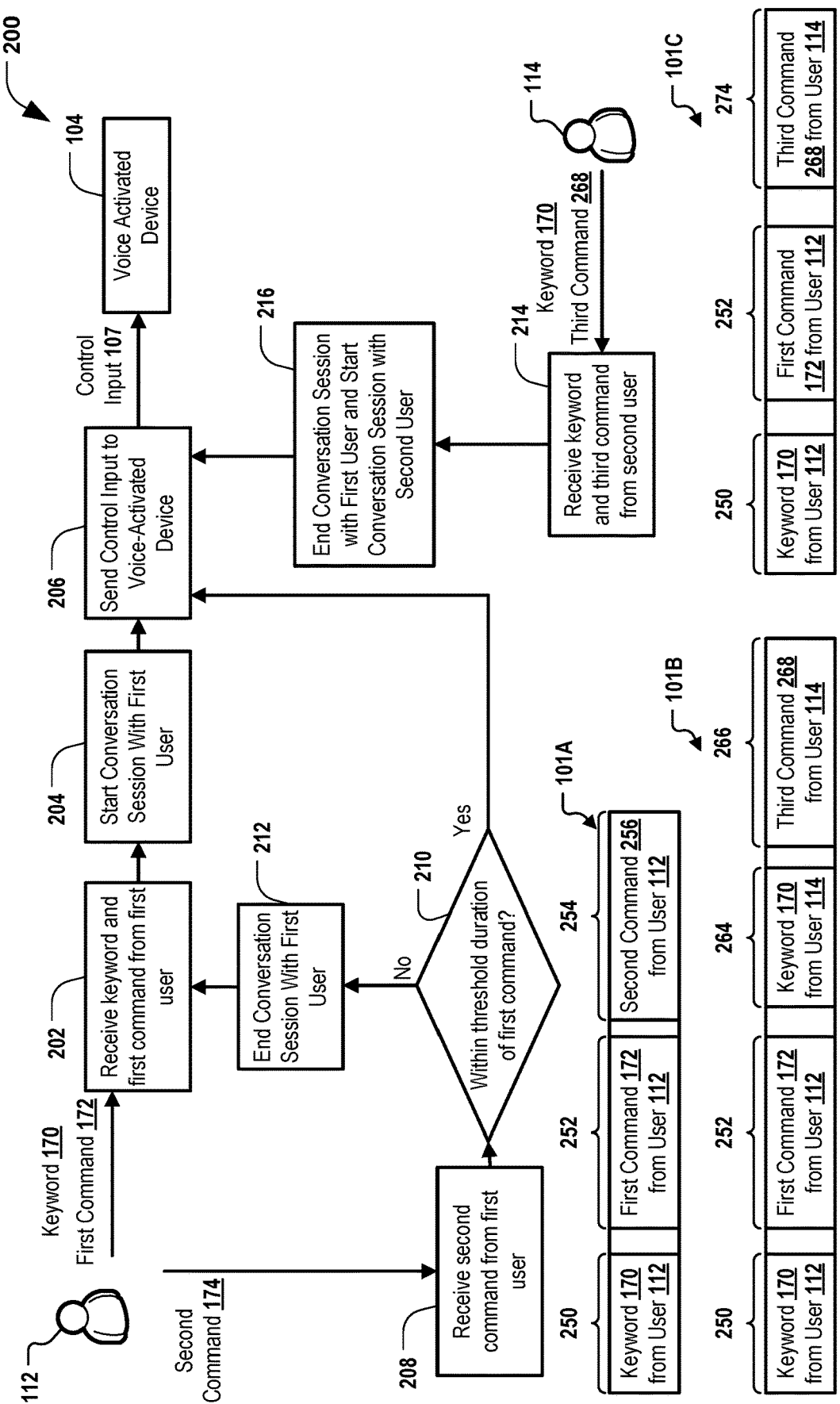
FIG. 2 is an illustrative example of operations that may be performed by the system of FIG. 1.

Referring to FIG. 2, an example of operations is shown and generally designated 200. In a particular aspect, one or more of the operations 200 are performed by the keyword detector 140, the user detector 142, the command detector 144, the conversation manager 150, the processor 108, the device 102, the system 100 of FIG. 1, or a combination thereof.

In FIG. 2, an audio signal 101A, an audio signal 101B, and an audio signal 101C are shown. Each of the audio signal 101A, the audio signal 101B, and the audio signal 101C is an illustrative example of the audio signal 101 of FIG. 1. Each of the audio signals 101A-C illustrates a different example of inputs that can be received via the audio signal 101. Explanation of how each of the audio signals 101A-C is processed is provided below, In a first example, operations associated with processing the audio signal 101A are described. A portion 250, a portion 252, and a portion 254 of the audio signal 101A correspond to the keyword 170 (e.g., "hello assistant"), the first command 172 (e.g., "play my music"), and a second command 256 ("set the volume to seven"), respectively. The example 200 includes receiving the keyword 170 (e.g., "hello assistant") and the first command 172 (e.g., "play my music") from the user 112, at 202. The keyword 170 (e.g., "hello assistant") and the first command 172 (e.g., "play my music") are received from the user 112 with no intervening receipt of the keyword 170 (e.g., from another user). The first command 172 (e.g., "play my music") and the second command 256 (e.g., "set the volume to seven") are received from the user 112 with no intervening receipt of the keyword 170.

A conversation session is started with the user 112, at 204. For example, the user detector 142 starts a conversation session with the user 112 by setting the keyword user ID 180 to indicate the user 112 and setting the active conversation indicator 164 to a second value (e.g., 1) to indicate that an active session with the user 112 is on-going, as described with reference to FIG. 1.

A control input 107 is sent to the voice activated device 104, at 206. For example, the command detector 144 generates a control input 107 based on the first command 172 (e.g., "play my music") and sends the control input 107 to the voice activated device 104 to initiate performance of one or more operations (e.g., playback of music) corresponding to the first command 172.

The second command 256 is received from the user 112, at 208. In a particular aspect, the second command 256 corresponds to the second command 174 of FIG. 1 received from the user 112.

A determination is made as to whether the second command 256 is received within a threshold duration of receiving the first command 172, at 210. In a particular aspect, the active timestamp 156 of FIG. 1 indicates a first time associated with receiving the first command 172 (e.g., "play my music"), and the command detector 144 of FIG. 1 determines whether a second time associated with receiving the second command 256 is within a threshold duration (e.g., 2 seconds, 10 seconds, 60 seconds, 2 minutes, etc.) of the first time. In some examples, the threshold duration can be adjusted on a per-user basis, such as based on a user history or a user-specified setting.

In response to determining that the second command 256 (e.g., "set the volume to seven") is received after the threshold duration of receiving the first command 172 (e.g., "play my music"), at 210, a conversation session with the user 112 is ended, at 212. For example, the command detector 144 of FIG. 1 ends a conversation session with the user 112 by setting the active conversation indicator 164 to a first value (e.g., 0) to indicate that there is no on-going conversation.

In response to determining that the second command 256 (e.g., "set the volume to seven") is received within the threshold duration of receiving the first command (e.g., "play my music"), at 210, proceeds to operation 206. For example, the command detector 144 of FIG. 1 generates the control input 107 based on the second command 256 (e.g., "set the volume to seven") and sends the control input 107 to the voice activated device 104 to initiate performance of one or more operations (e.g., setting a volume to seven) corresponding to the second command 256 (e.g., "set the volume to seven"). The first example thus illustrates initiating performance of multiple commands responsive to receiving the multiple commands from the same user 112 with no intervening receipt of the keyword 170 (e.g., "hello assistant").

In a second example, operations associated with processing the audio signal 101B are described. A portion 250, a portion 252, a portion 264, and a portion 266 of the audio signal 101B correspond to the keyword 170 (e.g., "hello assistant") received from the user 112, the first command 172 (e.g., "play my music") received from the user 112, the keyword 170 (e.g., "hello assistant") received from the user 114, and a third command 268 ("skip song") received from the user 114, respectively. The keyword 170 in the portion 250 and the first command 172 in the portion 252 are received from the user 112 with no intervening receipt of the keyword 170. The keyword 170 in the portion 264 and the third command 268 in the portion 266 are received from the user 114 with no intervening receipt of the keyword 170.

In this example, operations include receiving the keyword 170 (e.g., "hello assistant") and the first command 172 (e.g., "play my music") from the user 112, at 202, starting a conversation session with the user 112, at 204, and sending a control input 107 to the voice activated device 104, at 206, as described above, and also includes receiving the keyword 170 (e.g., "hello assistant") and the third command 268 (e.g., "skip song") from the user 114, at 214.

In this example, operations include ending the conversation session with the user 112 and starting a conversation session with the user 114, at 216. For example, the user detector 142, in response to receiving the keyword 170 (e.g., "hello assistant") from the user 114, sets the keyword user ID 180 to indicate a user ID of the user 114, sets the active conversation indicator 164 to a second value (e.g., 1), or both. In a particular aspect, setting the keyword user ID 180 to indicate the user ID of the user 114 ends the previous conversation session with the user 112. In a particular aspect, setting the keyword user ID 180 to indicate the user ID of the user 114 with the active conversation indicator 164 indicating the second value (e.g., 1) starts a conversation session with the user 114. After ending the conversation session with the user 112, a control input 107 is sent, at 206. For example, the command detector 144 of FIG. 1 generates the control input 107 based on the third command 268 and sends the control input 107 to the voice activated device 104 to initiate performance of one or more operations (e.g., initiate playback of a next song) corresponding to the third command 268 (e.g., "skip song"). The second example thus illustrates ending and starting conversation sessions with users based on receiving the keyword 170.

In a third example, operations associated with processing the audio signal 101C are described. A portion 250, a portion 252, and a portion 274 of the audio signal 101C correspond to the keyword 170 (e.g., "hello assistant") received from the user 112, the first command 172 (e.g., "play my music") received from the user 112, and the third command 268 ("skip song") received from the user 114, respectively. In this example, the conversation manager 150 receives the keyword 170 (e.g., "hello assistant") and the first command 172 (e.g., "play my music") from the user 112, starts a conversation session with the user 112, and sends a control input 107 to the voice activated device 104, as described above. In this aspect, the command detector 144 refrains from processing the third command 268 in response to determining that the third command 268 is spoken by a different user than the user 112 who spoke the keyword 170. For example, the command detector 144 refrains from processing the third command 268 in response to determining that one or more command user characteristics 178 associated with the portion 274 of the audio signal 101C do not match the keyword user characteristics 176 associated with the portion 250 of the audio signal 101C. As another example, the command detector 144 refrains from processing the third command 268 in response to determining that the command user ID 182 associated with the portion 274 does not match the keyword user ID 180 associated with the portion 250.

The example 200 thus illustrates that a conversation session is started with a first user in response to receiving the keyword 170 from the first user. During the conversation session with the first user, multiple commands from the first user can be processed without an intervening receipt of the keyword 170. The conversation session ends if a subsequent command is not received within a threshold duration of receiving a previous command from the same user. If the keyword 170 is received from a second user, any previous on-going conversation session is ended and a new conversation session is started. During the conversation session with the second user, multiple commands from the same second user can be processed without an intervening receipt of the keyword 170. If there is no on-going conversation session with a user, any commands received from the user are not processed.

Figure 3:
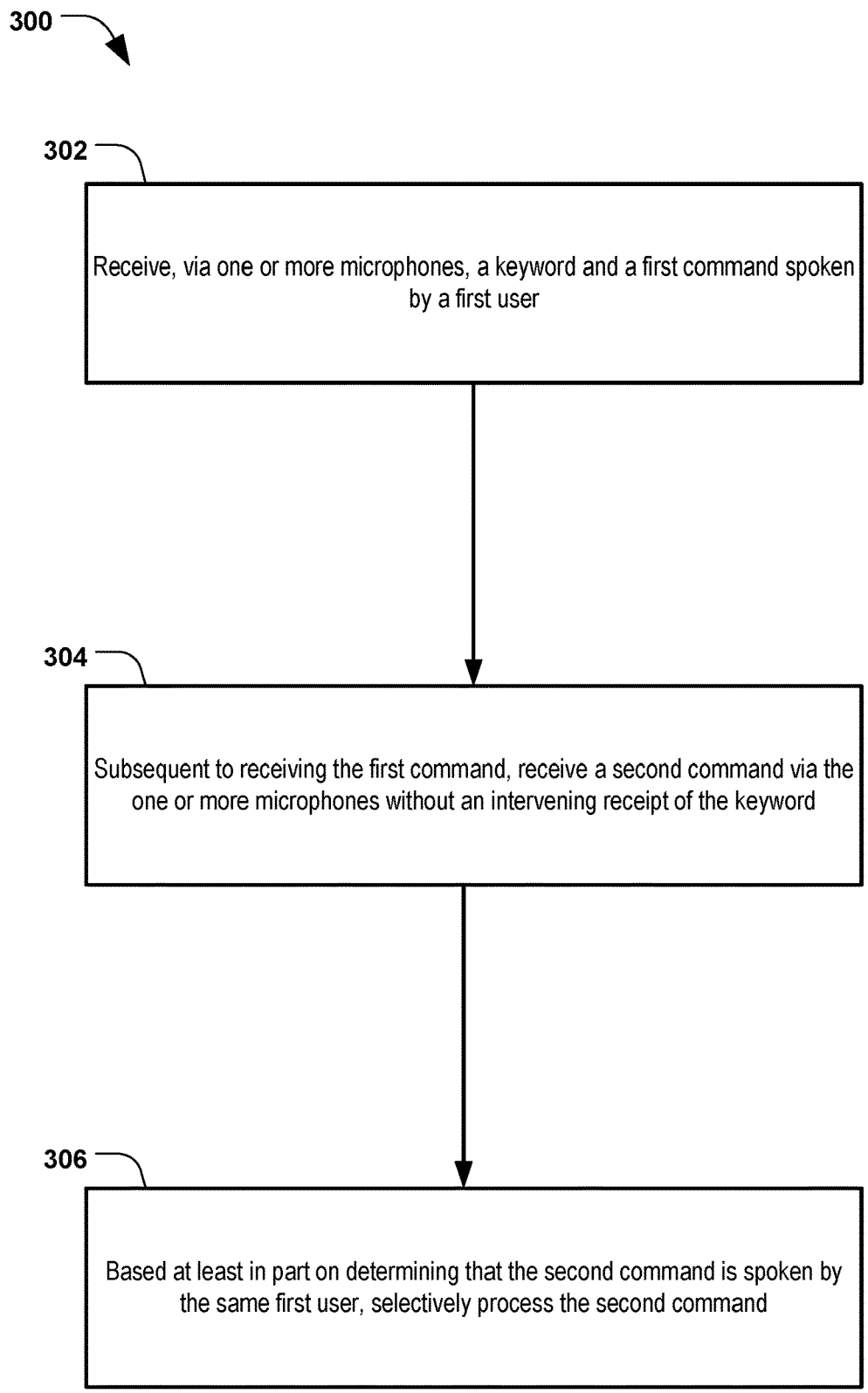
FIG. 3 is a flow chart illustrating a method of performing voice activation based on user recognition.

In FIG. 3, a method of performing voice activation based on user recognition is shown and generally designated 300. In a particular aspect, one or more operations of the method 300 are performed by keyword detector 140, the user detector 142, the command detector 144, the user direction detector 146, the conversation manager 150, the processor 108, the device 102, the system 100 of FIG. 1, or a combination thereof.

The method 300 includes receiving, via one or more microphones, a keyword and a first command spoken by a first user, at 302. For example, the conversation manager 150 of FIG. 1 receives, via the microphone 120, the keyword 170 (e.g., "hello assistant") and the first command 172 (e.g., "play my music") spoken by the user 112, as described with reference to FIGS. 1-2.

The method 300 also includes, subsequent to receiving the first command, receive a second command via the one or more microphones without an intervening receipt of the keyword, at 304. For example, the conversation manager 150 of FIG. 1, subsequent to receiving the first command 172 (e.g., "play my music"), receives the second command 174 (e.g., "set the volume to 7") via the microphone 120 without an intervening receipt of the keyword 170, as described with reference to FIGS. 1-2.

The method 300 further includes, based at least in part on determining that the second command is spoken by the same first user, selectively processing the second command, at 306. For example, the command detector 144, based at least in part on determining that the second command 174 is spoken by the same user 112, selectively processes the second command 174, as described with reference to FIGS. 1-2.

The method 300 thus enables processing of multiple commands spoken by the same user after speaking the keyword 170 without intervening receipt of the keyword 170. A user experience is improved by not having to say the keyword 170 before saying each command. Resource (e.g., processing cycles, time, or both) utilization is improved by the conversation manager 150 not having to process (e.g., store, detect, or both) portions of the audio signal 101 corresponding to the keyword 170 prior to each command.

Figure 4:
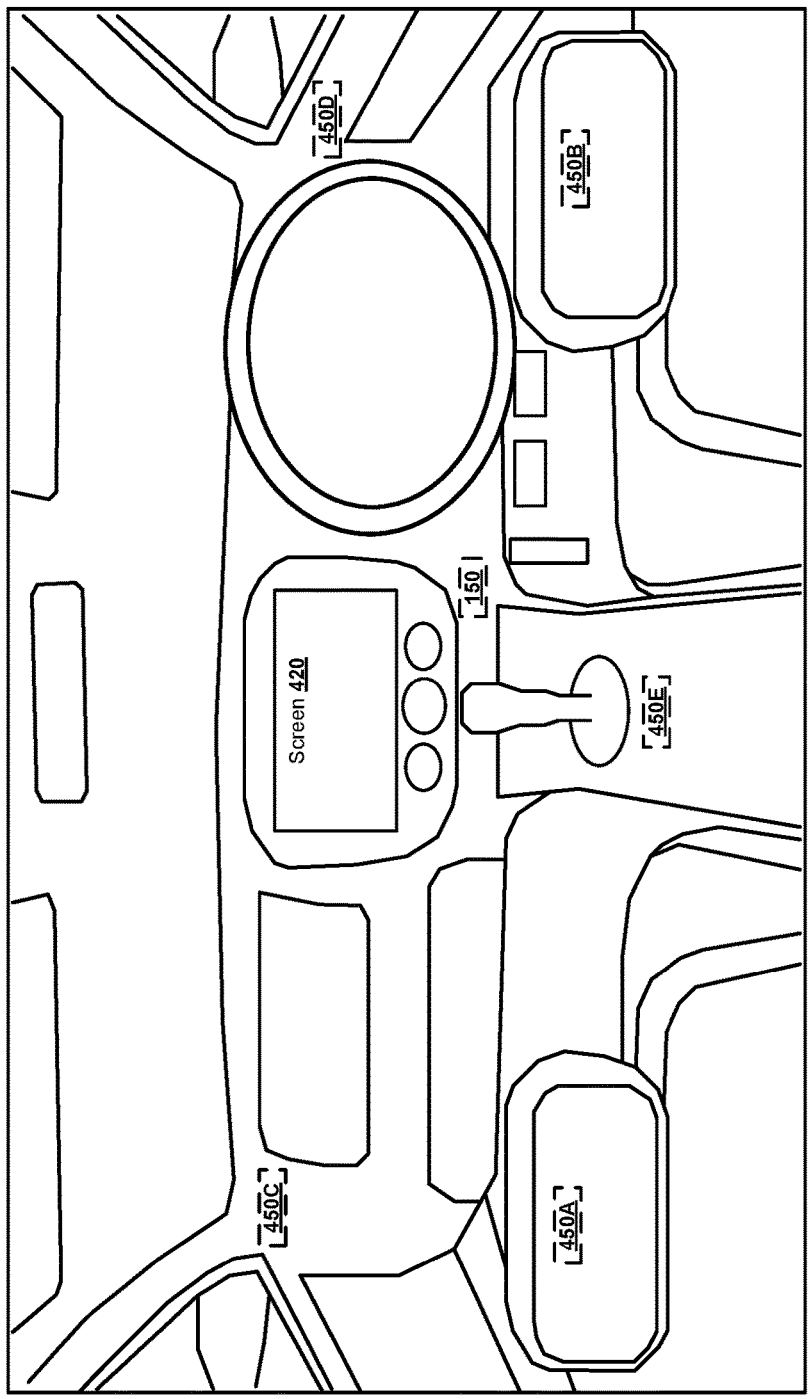
FIG. 4 is an illustrative example of a vehicle that incorporates aspects of the system of FIG. 1.

FIG. 4 is an illustrative example of a vehicle 400. According to one implementation, the vehicle 400 is a self-driving car. According to other implementations, the vehicle 400 can be a car, a truck, a motorcycle, an aircraft, a water vehicle, etc. The vehicle 400 includes a screen 420 (e.g., a display), one or more sensors 450, the conversation manager 150, or a combination thereof. The sensors 450 and the conversation manager 150 are shown using a dotted line to indicate that these components might not be visible to passengers of the vehicle 400. The conversation manager 150 can be integrated into the vehicle 400 or coupled to the vehicle 400.

In a particular aspect, the conversation manager 150 is coupled to the screen 420 and provides an output to the screen 420 responsive to detecting various events described herein. For example, the conversation manager 150 provides a first output to the screen 420 indicating that the keyword 170 is detected from a user associated with the keyword user ID 180. As another example, the conversation manager 150 provides a second output to the screen 420 indicating that the second command 174 is detected. In a particular example, the conversation manager 150 provides an output that indicates whether the second command 174 is being processed.

In a particular aspect, the user 112 (or another user) can select an option displayed on the screen 420 to enable or disable a conversation mode. For example, the conversation manager 150, in response to receiving a selection of the option, toggles the conversation mode 162 from enabled to disabled or vice versa. The sensors 450 include the image sensor 130, the microphone 120, the biometric sensor 190, or a combination thereof. In a particular aspect, sensor input of the sensors 450 indicates a location of the user 112. For example, sensors 450A-450E are associated with various locations within the vehicle 400. The conversation manager 150 can determine that the user 112 is located in the left back seat of the vehicle 400 in response to determining that the sensor input indicates that the user 112 is detected in closer proximity of the sensor 450A than the remaining sensors 450.

Thus, the techniques described with respect to FIGS. 1-2 enable a user in the vehicle 400 to initiate processing of multiple commands by speaking the keyword 170 followed by the multiple commands without an intervening receipt of the keyword 170.

Figure 5A:
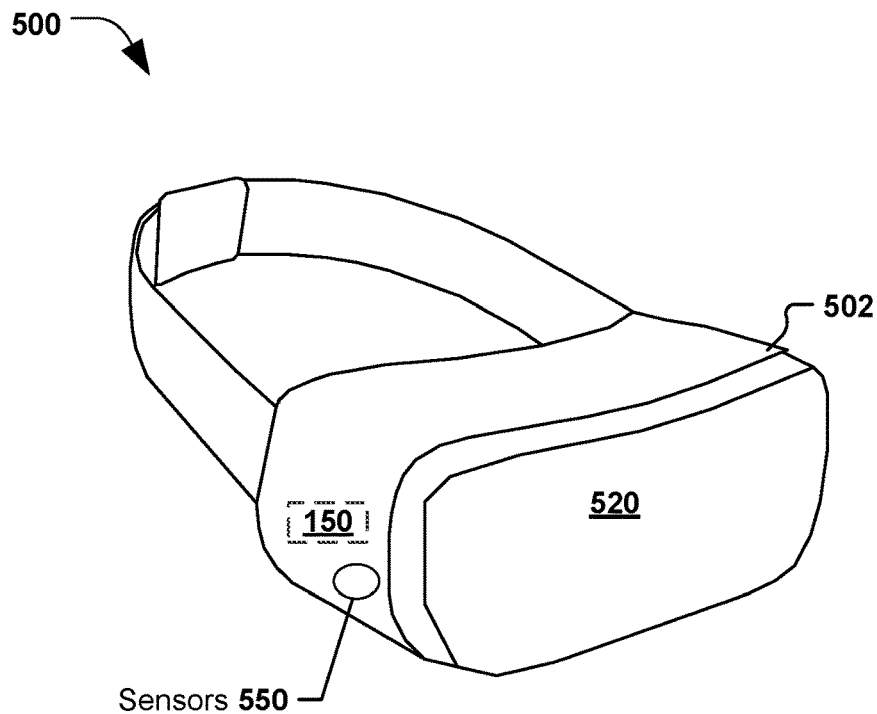
FIG. 5A is a diagram of a virtual reality or augmented reality headset that incorporates aspects of the system of FIG. 1.

FIG. 5A depicts an example of the conversation manager 150 integrated into a headset 502, such as a virtual reality headset, an augmented reality headset, a mixed reality headset, an extended reality headset, a head-mounted display, or a combination thereof. A visual interface device, such as a display 520, is positioned in front of the user's eyes to enable display of augmented reality or virtual reality images or scenes to the user while the headset 502 is worn. In a particular example, the display 520 is configured to display output of the conversation manager 150, as described with reference to FIG. 4. Sensors 550 can include one or more microphones, cameras, or other sensors, and can include the microphone 120, the image sensor 130, the biometric sensor 190 of FIG. 1, or a combination thereof. Although illustrated in a single location, in other implementations one or more of the sensors 550 can be positioned at other locations of the headset 502, such as an array of one or more microphones and one or more cameras distributed around the headset 502 to detect multi-modal inputs.

Figure 5B:
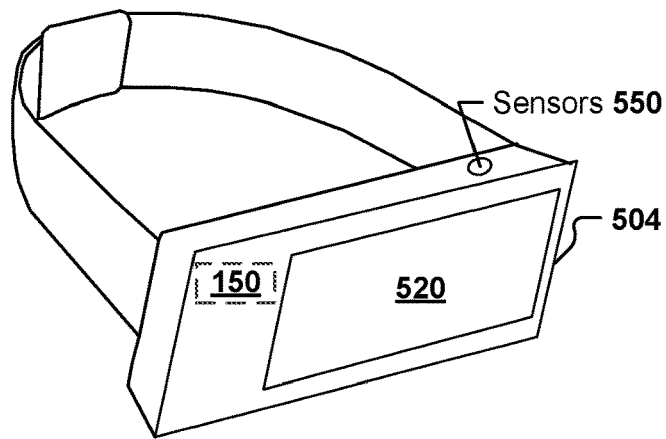
FIG. 5B is a diagram of a wearable electronic device that incorporates aspects of the system of FIG. 1.

FIG. 5B depicts an example of the conversation manager 150 integrated into a wearable electronic device 504, illustrated as a "smart watch," that includes the display 520 and the sensors 550. The sensors 550 enable detection, for example, of user input based on modalities such as video, speech, and gesture.

Figure 6:
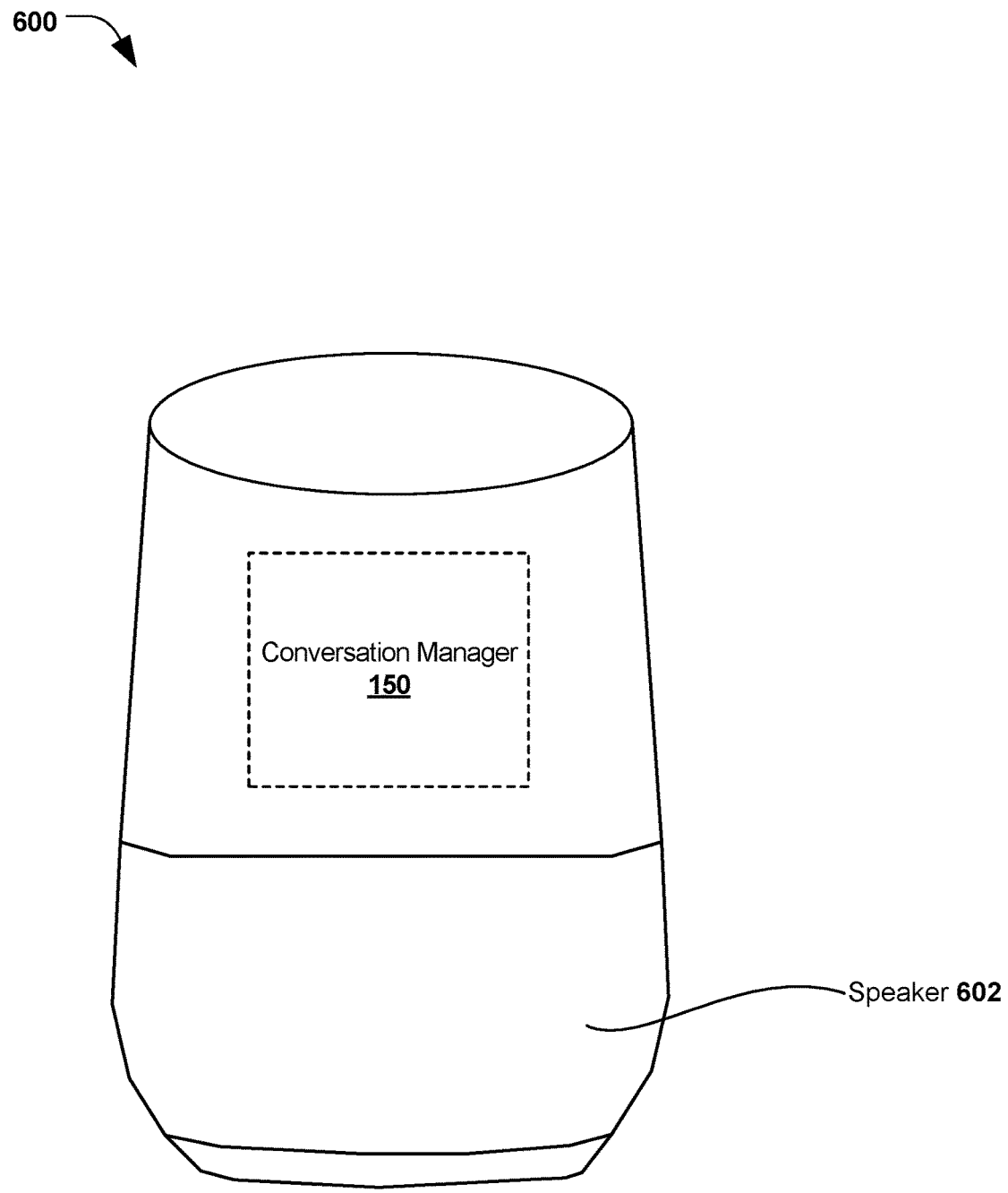
FIG. 6 is an illustrative example of a voice-controlled speaker system that incorporates aspects of the system of FIG. 1.

FIG. 6 is an illustrative example of a voice-controlled speaker system 600. The voice-controlled speaker system 600 can have wireless network connectivity and is configured to execute an assistant operation. The conversation manager 150 is included in the voice-controlled speaker system 600. The voice-controlled speaker system 600 also includes a speaker 602. During operation, in response to receiving a verbal command, the voice-controlled speaker system 600 can execute assistant operations. The assistant operations can include adjusting a temperature, playing music, turning on lights, etc. For example, the assistant operations are performed responsive to receiving a command after a keyword 170 (e.g., "hello assistant"). In some implementations, the conversation manager 150 can process multiple commands from the same user without intervening receipt of the keyword 170.

Figure 7:
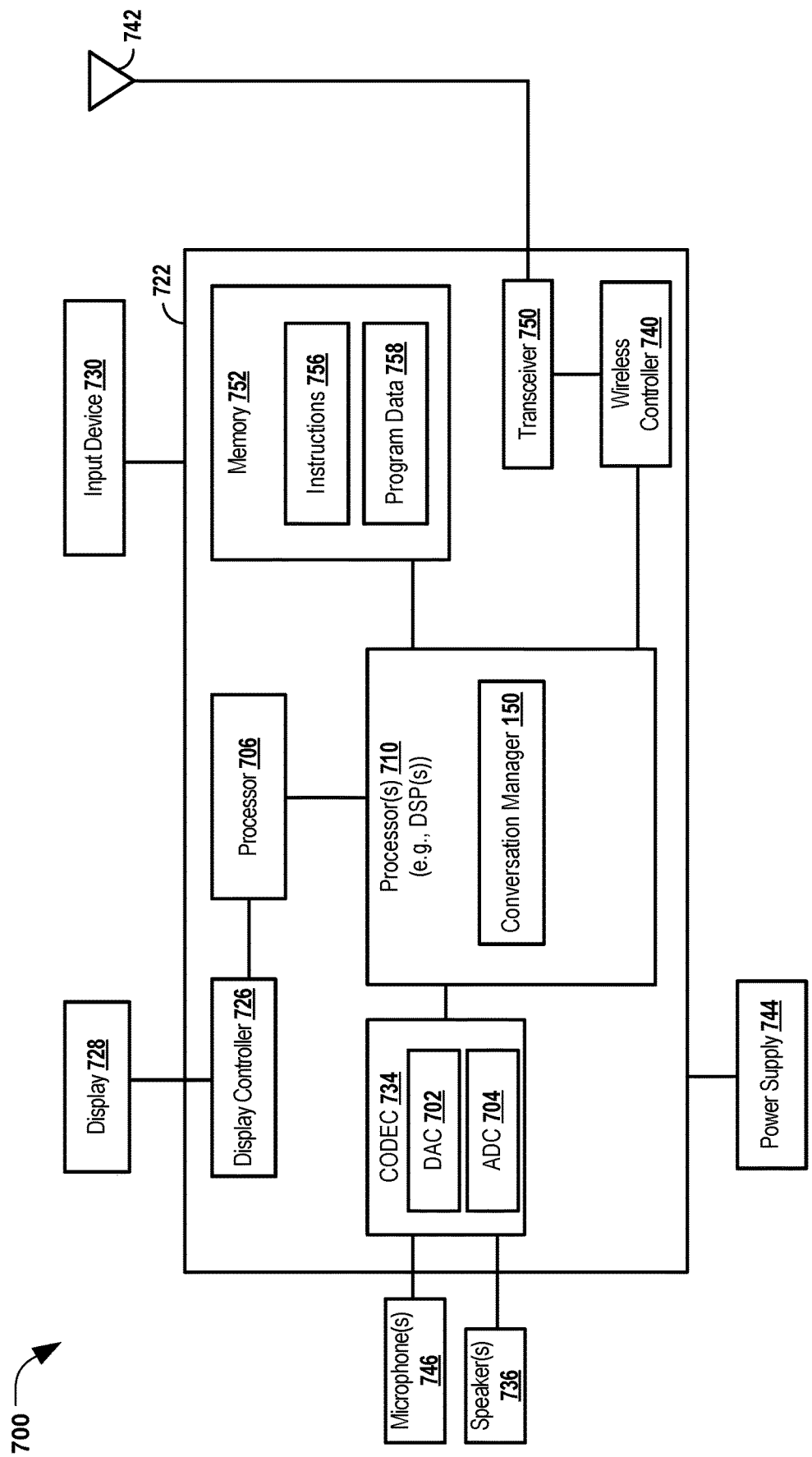
FIG. 7 is a block diagram of a particular illustrative example of a device that is operable to perform voice activation based on user recognition.

Referring to FIG. 7, a block diagram of a particular illustrative implementation of a device is depicted and generally designated 700. In various implementations, the device 700 may have more or fewer components than illustrated in FIG. 7. In an illustrative implementation, the device 700 corresponds to the device 102, the voice activated device 104, or both, of FIG. 1. In an illustrative implementation, the device 700 may perform one or more operations described with reference to FIGS. 1-6.

In a particular implementation, the device 700 includes a processor 706 (e.g., a central processing unit (CPU)). The device 700 may include one or more additional processors 710 (e.g., one or more DSPs). The processor 710 may include the keyword detector 140, the user detector 142, the command detector 144, the user direction detector 146, the conversation manager 150, or a combination thereof. In a particular aspect, the processor 108 of FIG. 1 corresponds to the processor 706, the processor 710, or a combination thereof.

The device 700 may include a memory 752 and a CODEC 734. The memory 752 may include instructions 756 that are executable by the one or more additional processors 710 (or the processor 706) to implement one or more operations described with reference to FIGS. 1-6. In an example, the memory 752 corresponds to the memory 132 and includes a computer-readable storage device that stores the instructions 756. The instructions 756, when executed by one or more processors (e.g., the processor 108, the processor 706, or the processor 710, as illustrative examples), cause the one or more processors to receive, via one or more microphones, a keyword and a first command spoken by a first user. The instructions 756, when executed by the one or more processors, also cause the one or more processors to, subsequent to receiving the first command, receive a second command via the one or more microphones without an intervening receipt of the keyword. The instructions 756, when executed by the one or more processors, also cause the one or more processors to, based at least in part on determining that the second command is spoken by the same first user, selectively process the second command.

The memory 752 may include program data 758. In a particular aspect, the program data 758 includes or indicates the user model 160, the conversation mode 162, the active conversation indicator 164, the commands 168, the user ID 158, the active timestamp 156, or a combination thereof. The device 700 may include a wireless controller 740 coupled, via a transceiver 750, to an antenna 742. The device 700 may include a display 728 coupled to a display controller 726. In a particular aspect, the display 728 includes the screen 420 of FIG. 4, the display 520 of FIG. 5, or both.

One or more speakers 736 and one or more microphones 746 may be coupled to the CODEC 734. In a particular aspect, the speaker 736 includes the speaker 602 of FIG. 6. In a particular aspect, the microphone 746 includes the microphone 120 of FIG. 1. The CODEC 734 may include a digital-to-analog converter 702 and an analog-to-digital converter 704. In a particular implementation, the CODEC 734 may receive analog signals from the microphone 746, convert the analog signals to digital signals using the analog-to-digital converter 704, and provide the digital signals to the processor 710. The processor 710 (e.g., a speech and music codec) may process the digital signals, and the digital signals may further be processed by the conversation manager 150. In a particular implementation, the processor 710

(e.g., the speech and music codec) may provide digital signals to the CODEC 734. The CODEC 734 may convert the digital signals to analog signals using the digital-to-analog converter 702 and may provide the analog signals to the speakers 736. The device 700 may include an input device 730. In a particular aspect, the input device 730 includes the image sensor 130, the biometric sensor 190 of FIG. 1, the sensors 450 of FIG. 4, the sensors 550 of FIG. 5, or a combination thereof.

In a particular implementation, the device 700 may be included in a system-in-package or system-on-chip device 722. In a particular implementation, the memory 752, the processor 706, the processor 710, the display controller 726, the CODEC 734, the wireless controller 740, and the transceiver 750 are included in a system-in-package or system-on-chip device 722. In a particular implementation, the input device 730 and a power supply 744 are coupled to the system-on-chip device 722. Moreover, in a particular implementation, as illustrated in FIG. 7, the display 728, the input device 730, the speaker 736, the microphone 746, the antenna 742, and the power supply 744 are external to the system-on-chip device 722. In a particular implementation, each of the display 728, the input device 730, the speaker 736, the microphone 746, the antenna 742, and the power supply 744 may be coupled to a component of the system-on-chip device 722, such as an interface or a controller.

The device 700 may include a voice activated device, an audio device, a wireless speaker and voice activated device, a portable electronic device, a car, a vehicle, a computing device, a communication device, an internet-of-things (IoT) device, a virtual reality (VR) device, a smart speaker, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, or any combination thereof. In a particular aspect, the processor 706, the processor 710, or a combination thereof, are included in an integrated circuit.

In conjunction with the described implementations, an apparatus includes means for receiving an audio signal corresponding to speech. For example, the means for receiving includes the microphone 120, the biometric sensor 190, the processor 108, the conversation manager 150, the keyword detector 140, the command detector 144, the user detector 142, the user direction detector 146, the system 100 of FIG. 1, the microphone 746, the input device 730, the processor 706, the processor 710, one or more other circuits or components configured to receive an audio signal corresponding to speech, or any combination thereof.

The apparatus also includes means for determining that the audio signal includes a keyword and a first command spoken by a first user and also includes a second command that follows the first command without the keyword in between the first command and the second command. For example, the means for determining includes the processor 108, the conversation manager 150, the keyword detector 140, the command detector 144, the user detector 142, the system 100 of FIG. 1, the processor 706, the processor 710, one or more other circuits or components configured to determine that an audio signal includes a keyword and a first command spoken by a first user, and includes a second command that follows the first command without the keyword in between the first command and the second command, or any combination thereof.

The apparatus further includes means for selectively processing the second command based at least in part on determining that the second command is spoken by the same first user. For example, the means for selectively processing includes the processor 108, the conversation manager 150, the command detector 144, the system 100 of FIG. 1, the processor 706, the processor 710, one or more other circuits or components configured to selectively process the second command based at least in part on determining that the second command is spoken by the same first user, or any combination thereof.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:
1. A device comprising:
a memory configured to store instructions; and
one or more processors configured to execute the instructions to:
receive, via one or more microphones, a keyword and a first command spoken by a first user;
subsequent to receiving the first command, receive a second command via the one or more microphones without an intervening receipt of the keyword;

based on determining that the first user faced the device while speaking the second command, determine that the first user directed the second command to the device; and based at least in part on determining that the second command is spoken by the first user and that the first user directed the second command to the device, process the second command, wherein the second command includes an instruction to control a second device distinct from the device, and wherein the first user is determined to have directed the second command to the device while the first user faced the device independent of whether the first user faced the second device.

2. The device of claim 1, wherein the one or more processors are configured to execute the instructions to process the second command based at least in part on determining that a conversation mode is enabled.

3. The device of claim 1, wherein the one or more processors are configured to execute the instructions to process the second command based at least in part on determining that the second command is received within a threshold duration of receiving the first command.

4. The device of claim 1, wherein the one or more processors are configured to execute the instructions to:
subsequent to receiving the second command, receive, via the one or more microphones, the keyword spoken by a second user;
receive, via the one or more microphones, a third command spoken by the first user; and
based on determining that the third command spoken by the first user is received subsequent to receiving the keyword spoken by the second user without an intervening receipt of the keyword spoken by the first user, refrain from processing the third command.

5. The device of claim 4, wherein receiving the keyword from the first user initiates a first session with the first user, wherein receiving the keyword from the second user initiates a second session with the second user, and wherein initiating the second session ends the first session.

6. The device of claim 5, wherein the first session is associated with a period of time when the first session is scheduled to be active, wherein the keyword is received from the second user during the period of time, and wherein the third command is received during the period of time.

7. The device of claim 1, wherein the one or more processors are configured to execute the instructions to determine that the keyword is spoken by the first user based on voice recognition, facial recognition, or other biometric recognition.

8. The device of claim 1, wherein the one or more processors are configured to execute the instructions to determine that the keyword is spoken by the first user based on a direction of arrival analysis associated with the keyword.

9. The device of claim 1, further comprising a biometric sensor coupled to the one or more processors, wherein the one or more processors are further configured to execute the instructions to:
receive biometric input from the biometric sensor; and
determine that the keyword is spoken by the first user based on the biometric input.

10. The device of claim 1, wherein the one or more processors are included in an integrated circuit.

11. The device of claim 1, wherein the one or more processors are included in a vehicle.

12. The device of claim 1, wherein the one or more processors are implemented in an audio device, and wherein the audio device includes a wireless speaker and voice activated device with an integrated assistant application.

13. The device of claim 1, wherein the one or more processors are integrated into at least one of a voice activated device, a wireless speaker and voice activated device, a portable electronic device, a car, a vehicle, a computing device, a communication device, an internet-of-things (IoT) device, a virtual reality (VR) device, or a combination thereof.

14. The device of claim 1, wherein the determination that the first user faced the device while speaking the second command includes a determination that the first user faced at least one of the one or more microphones while speaking the second command.

15. The device of claim 1, further comprising a camera, and wherein the determination that the first user faced the device while speaking the second command includes a determination that the first user faced the camera while speaking the second command.

16. A method comprising:
receiving, via one or more microphones of a device, a keyword and a first command spoken by a first user;
subsequent to receiving the first command, receiving a second command via the one or more microphones without an intervening receipt of the keyword;
based on determining that the first user faced the device while speaking the second command, determining that the first user directed the second command to the device; and
based at least in part on determining that the second command is spoken by the first user and that the first user directed the second command to the device, processing the second command, wherein the second command includes an instruction to control a second device distinct from the device, and wherein the first user is determined to have directed the second command to the device while the first user faced the device independent of whether the first user faced the second device.

17. The method of claim 16, further comprising:
receiving an audio signal from the one or more microphones;
determining that a first portion of the audio signal corresponds to the keyword spoken by the first user; and
determining that a second portion of the audio signal corresponds to the first command spoken by the first user.

18. The method of claim 17, further comprising:
determining first voice characteristics indicated by the first portion of the audio signal; and
generating, based on the first voice characteristics, a speech model associated with the first user.

19. The method of claim 17, further comprising:
determining first voice characteristics indicated by the first portion of the audio signal; and
in response to determining that the first voice characteristics match a speech model associated with the first user, determining that the keyword is spoken by the first user.

20. The method of claim 17, further comprising:
determining that a third portion of the audio signal corresponds to the second command;
determining second voice characteristics indicated by the third portion of the audio signal; and determining that the second command is spoken by the first user in response to determining that the second voice characteristics match a speech model associated with the first user.

21. The method of claim 16, further comprising, in response to determining that the keyword is spoken by the first user, initiating a first conversation session associated with the first user.

22. The method of claim 21, further comprising processing the second command based on determining that the second command is received during the first conversation session.

23. The method of claim 21, further comprising, in response to receiving the keyword spoken by a second user during the first conversation session:
ending the first conversation session associated with the first user; and
initiating a second conversation session associated with the second user.

24. The method of claim 21, further comprising, in response to receiving an end session command spoken by the first user, ending the first conversation session associated with the first user.

25. The method of claim 16, further comprising:
receiving, via an image sensor, an image of the first user; and
in response to determining that the image of the first user is received concurrently with receiving the keyword, determining that the keyword is spoken by the first user.

26. A device comprising:
a memory configured to store instructions; and
one or more processors configured to execute the instructions to:
receive, via one or more microphones, a keyword and a first command spoken by a first user;
initiate a first conversation session with the first user based on receipt of the keyword and the first command from the first user;
receive, via the one or more microphones, the keyword and a second command spoken by a second user while the first conversation session with the first user is ongoing;
terminate the first conversation session with the first user and initiate a second conversation session with the second user based on receipt of the keyword and the second command from the second user; and
while the second conversation session with the second user is ongoing:
based at least in part on determining that a third command, received from the second user via the one or more microphones without an intervening receipt of the keyword, is spoken by the second user and that the second user directed the third command to the device, process the third command, wherein the third command includes an instruction to control a second device distinct from the device, and wherein the second user is determined to have directed the third command to the device while the second user faced the device independent of whether the second user faced the second device; and
refrain from processing a fourth command that is received, via the one or more microphones, from the first user.

27. The device of claim 26, wherein the one or more processors are configured to execute the instructions to:
determine that the fourth command is received from the first user based on a first direction of arrival analysis of the fourth command; and
determine that the third command is received from the second user based on a second direction of arrival analysis of the third command.

28. The device of claim 27, wherein the first direction of arrival analysis corresponds to a first location of the first user and the second direction of arrival analysis corresponds to a second location of the second user.

29. A device comprising:
a memory configured to store instructions; and
one or more processors configured to execute the instructions to:
initiate a first conversation session with a first user based on receiving, via one or more microphones, a keyword from the first user, wherein commands received from the first user via one or more microphones during the first conversation session are processed and commands received from a second user via the one or more microphones during the first conversation session are not processed;
based at least in part on determining that a particular command is spoken by the first user during the first conversation session and that the first user directed the particular command to the device, process the particular command, wherein the particular command includes an instruction to control a second device distinct from the device, and wherein the first user is determined to have directed the particular command to the device while the first user faced the device independent of whether the first user faced the second device; and
terminate the first conversation session with the first user and initiate a second conversation session with the second user based on receiving, via the one or more microphones, the keyword from the second user during the first conversation session, wherein commands received from the second user via the one or more microphones during the second conversation session are processed and commands received from the first user via the one or more microphones during the second conversation session are not processed.

30. The device of claim 29, wherein the one or more processors are configured to execute the instructions to distinguish between speakers of received commands based on direction of arrival analyses of the received commands.

* * * * *